Dec. 15, 1936.   R. C. BATEMAN   2,064,778
TIRE MOLD AND METHOD OF MAKING THE SAME
Filed April 21, 1934   4 Sheets-Sheet 1

Inventors
Ralph C. Bateman

Attorney

Dec. 15, 1936.    R. C. BATEMAN    2,064,778
TIRE MOLD AND METHOD OF MAKING THE SAME
Filed April 21, 1934    4 Sheets—Sheet 2

Inventors
Ralph C. Bateman
By
Attorney

Inventors
Ralph C. Bateman
By
Attorney

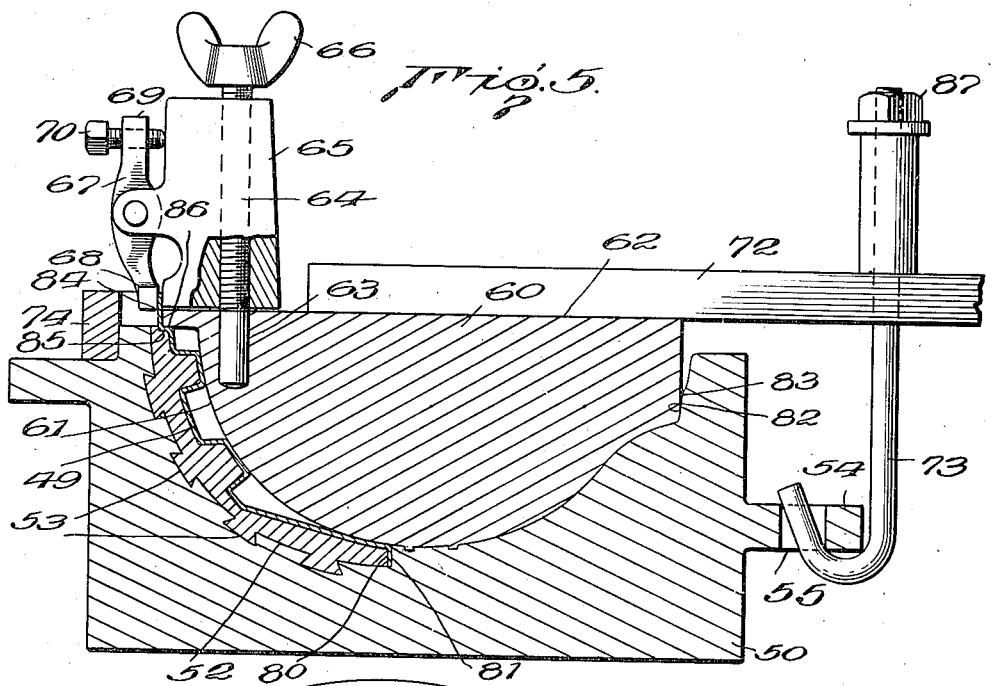

Patented Dec. 15, 1936

2,064,778

UNITED STATES PATENT OFFICE 2,064,778

TIRE MOLD AND METHOD OF MAKING THE SAME

Ralph C. Bateman, Akron, Ohio, assignor to Wingfoot Corporation, Wilmington, Del., a corporation of Delaware Application April 21, 1934, Serial No. 721,793

4 Claims. (Cl. 204—8)

This invention relates to an improved, less costly mold of the type used in shaping rubber motor vehicle tires, and to a method and apparatus for economically producing such molds or other similar articles. More particularly the invention concerns a tire mold comprised of a heavy cast frame and a molding face consisting at least in part of an electroformed shell, rigidly mounted in the frame. The shell, which is preferably of nickel, may be made large enough to form the complete molding face but usually only serves to mold the tread section of the tire. In the latter case the side walls of the tire are molded directly by the cast mold frame which is machined to the necessary configuration. The invention includes the electroformed shell, particularly a nickel shell, and method and apparatus for forming the same, and also a treated rubber cathode suitable for use in the manufacture of such a shell or a great variety of other objects, particularly objects having irregular surfaces.

The production of tire molds by the usual method is accomplished only with considerable difficulty occasioned by the great amount and complexity of the engraving necessary to form the tread design upon the face thereof. According to the present invention, however, the necessity for this engraving is eliminated and accurate molds are produced simply and economically.

In general the new method comprises forming a metallic shell by electroplating a rubber matrix of the shape of one half of the tread of a tire, the half being obtained by dividing the tread along a circumferentially extending medial line. The electroformed shell so obtained is mounted in a mold frame and sealed in place with babbitt or some other soft metal.

A number of outstanding features of novelty characterize the improved application of this general method. The rubber matrix, stretched slightly upon a form to compensate for the shrinkage which has occurred during its vulcanization, is metallized, preferably by spraying with a bronze or copper lacquer, and is subsequently dipped into an alkaline cyanide solution to silver the surface and thus improve the metallization. To this metallizing treatment is due much of the credit for the perfection of the electroformed shells and the rapidity with which the plating may be started.

The use of a contact ring which clamps against the inner edge of the matrix throughout its entire circumference is another important feature of novelty. By this means current is supplied to all portions of the surface of the matrix without substantial variation in the electric potential. A second contact ring may be clamped to the outer edge of the matrix to distribute the current with still greater evenness. Other means capable of supplying current to substantially the entire circumference of the matrix may be substituted.

During plating the matrix is suspended in a horizontal position where plating proceeds equally and simultaneously over the entire surface without the necessity of a great quantity of plating solution or of continuous rotation of the matrix. Every precaution is taken to remove foreign material from the plating tank. Both the anodes and the cathode matrix are surrounded by porous bags and the solution is filtered before use and continuously during plating.

The plating bath may be of the usual type, but preferably is a bath, far exceeding in nickel concentration the baths heretofore used. With a high concentration of nickel in the bath, control of the bath composition has been found to be greatly simplified and much higher current densities may be used with the surprising result of increased throwing power and ductile, uniform deposits in the grooves as well as upon the raised portions of the matrix. Hydrogen peroxide which prevents brittle deposits is contained in the bath in a quantity closely controlled by use of a new indicator and the acidity of the bath is likewise controlled and adjusted at frequent intervals. United States patent applications by Fred K. Bezzenberger, Serial No. 703,247, and by Fred K. Bezzenberger and Ralph C. Bateman Serial No. 703,246 were filed on December 20, 1933 and relate to the general application of the new bath composition, its control, and processes of using it for the electrodeposition of nickel. The present application is in part a continuation of application 703,246 as to so much of the present invention as is described therein.

These features of novelty as well as many others including the method of mounting the electrodeposited shell in the tire mold frame will be explained in detail by describing the example shown in the accompanying drawings in which:

Figure 5 is a vertical section of the same taken on line 5—5 of Figure 4.

Figure 6 is a top plan view of the finished mold.

The present invention is concerned particularly with the production of tire molds and the illustration is of a method and apparatus for that purpose. As illustrated the new apparatus comprises a cathode assembly; a plating tank and auxiliary equipment, and a mounting form for mounting the electroformed shell in a mold frame.

Cathode assembly

Figure 1:
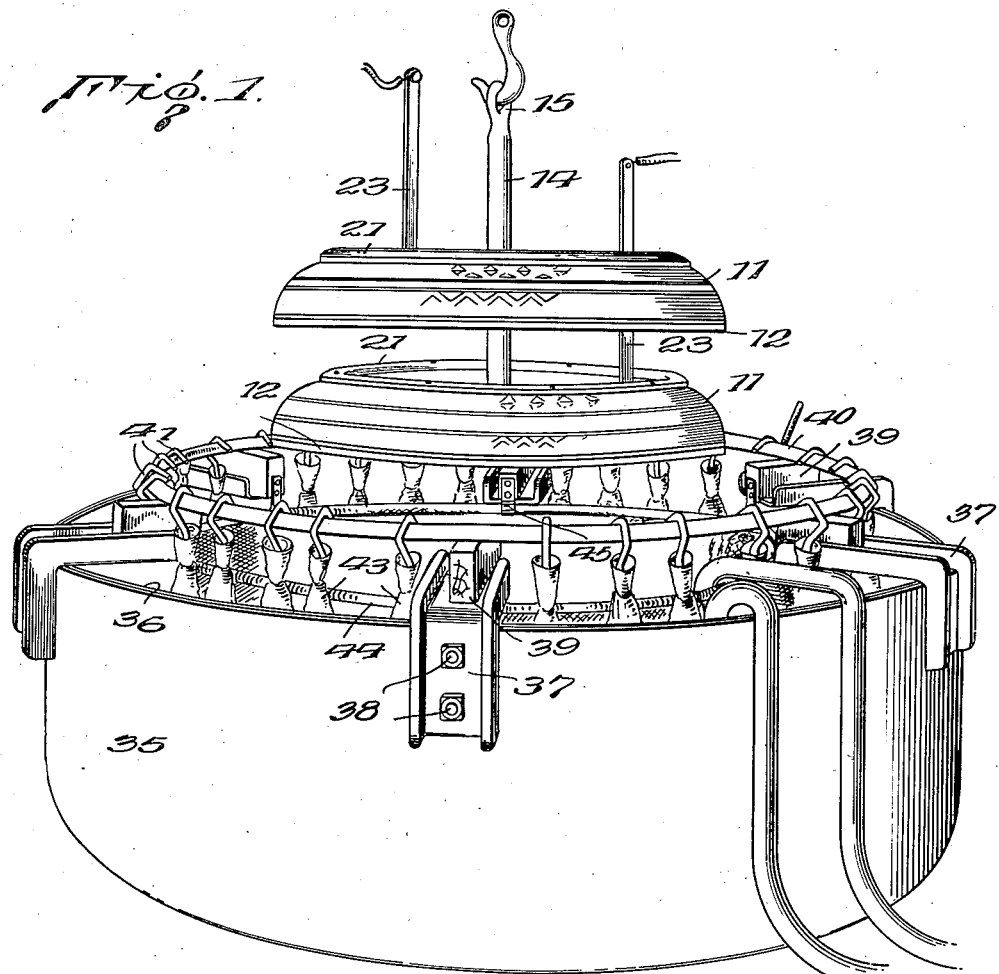
Figure 1 is a perspective view of the cathode and plating tank with the cathode lifted from the tank.
Figure 7:
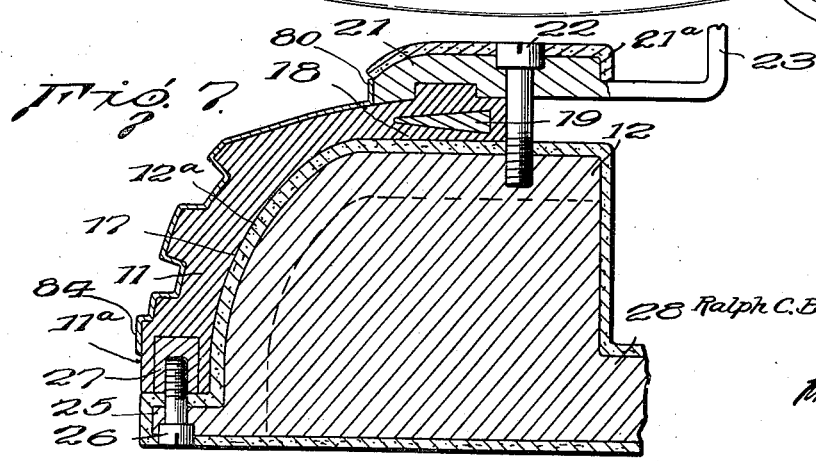
Figure 7 is an enlarged view of a portion of Figure 2.
Figure 2:
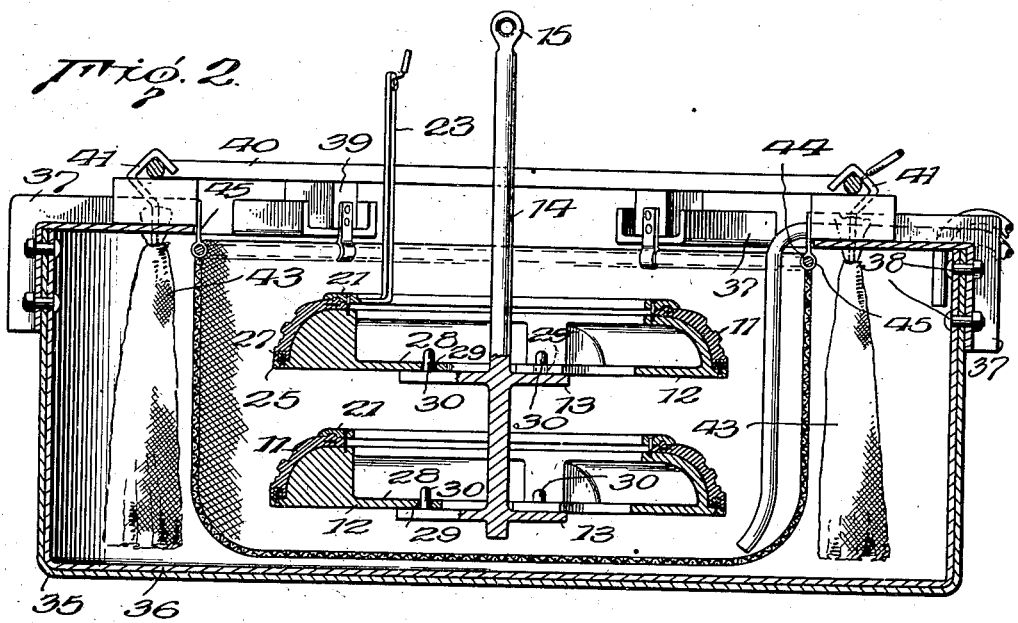
Figure 2 is a vertical section through the center of the tank.
Figure 4:
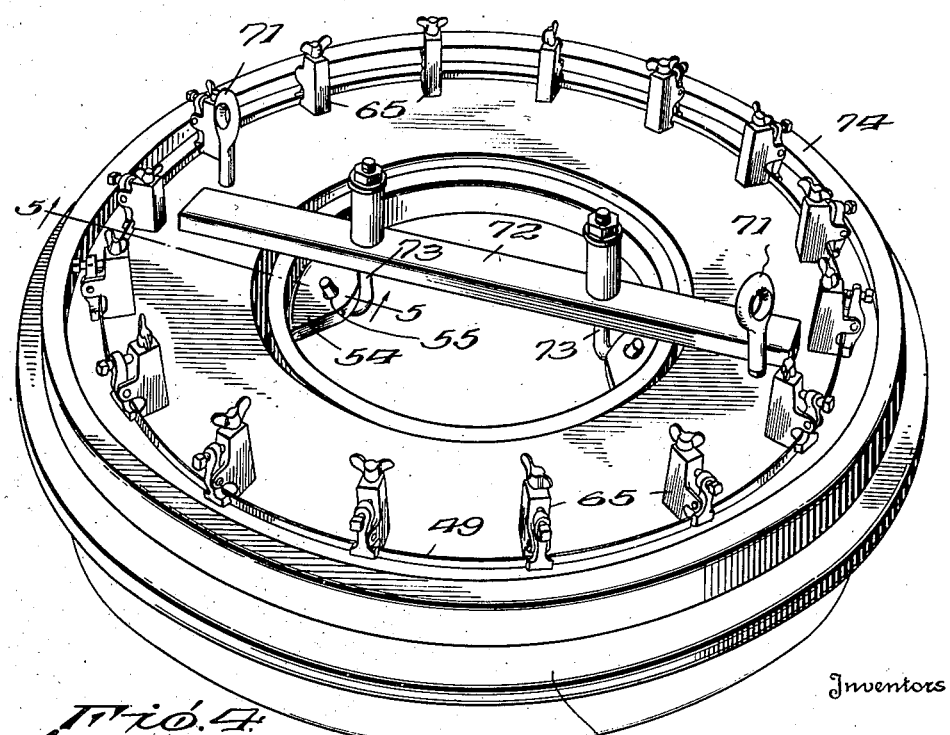
Figure 4 is a perspective of the mold frame with the electroformed shell and mounting form therein.

The cathode assembly comprises a toroidal matrix 11 of soft rubber mounted upon a form 12 which is in turn supported by a horizontal triangular plate 13. The plate 13 is integral with a vertical rod 14 adapted to hang from a hook or other suitable support by an eye 15 at its upper end. A plurality of the matrix-form assemblies may be suspended upon a single supporting rod provided with the requisite number of triangular plates. The drawings, Figures 1 and 2, shows two triangular plates 13, upon each of which rests a matrix-form assembly.

The form 12 is annular in shape with an outer surface 17 shaped to support and slightly stretch the matrix 11 which has the shape of a lateral one half of a tire tread section. Completely covering the form is a coating 12a of a hard rubber which serves to prevent the form from receiving a coating of the metal to be deposited upon the matrix. At the inner or upper edge of the matrix supporting surface 17 is a flat section or surface 18. The matrix overlying this section of surface is thickened slightly and contains imbedded therein a bead member 19 to prevent that part of the matrix from stretching. The bead member is preferably a steel ring plated with brass so that the rubber will readily adhere to it.

Against the portion of matrix overlying the flat surface 18 and containing the bead member 19 a flat ring 21 of copper or other conductive metal is bolted by cap screws 22 which extend into the form 12 adjacent the edge of the matrix. The heads of these bolts are advantageously daubed with a non-conducting paste to prevent their becoming plated. The ring makes electrical contact with the metallized surface throughout substantially the whole circumference of the matrix. A vertical bus bar 23, is connected at its lower end to the ring 21 and at the upper end to the source of plating current. The upper and inner surfaces of the ring are covered with hard rubber 21a to prevent their becoming plated, but the outer surface is left bare to receive plating which forms an upstanding lip on the electroformed shell. Modifications in the form of the conductor ring may be readily made so long as contact is had over substantially the entire circumference of the matrix.

At the lower or outer edge of the matrix supporting surface of the form 12, is a radially extending flange 25 against which the lower edge of the matrix is bolted by cap screws 26 extending through the flange and into a bead member 27 imbedded in the lower edge of the matrix. The bolting of the lower edge of the matrix against the radial flange provides the necessary stretching of the matrix to compensate for the shrinkage which takes place in the vulcanization of the matrix. Like the upper bead member, this bead member is also a brass plated steel ring to which the rubber matrix will readily adhere.

Except for the two bead members which are of metal, the matrix is of soft rubber without carbon black and with a minimum of metal salts, preferably of the following formula although other formulas may be substituted.

| | Parts by weight |
|---|---|
| Smoked sheet rubber | 100 |
| Zinc oxide | 50 |
| Sulphur | 4 |
| Mercaptobenzotaiazole | 0.5 |
| Stearic acid | 1 |
| Pine tar | 1.5 |

Three lugs 28 spaced one third of the circumference apart around the inside of the annular form 12 project inwardly to support the form upon the triangular plate 13. Each lug is pierced by a hole 29 into which a corresponding upwardly extending pin 30 on the plate 13 enters to secure the form in place upon the plate.

Metallization of the matrix

After the cathode has been assembled but before the contact ring 21 has been bolted in place, the surface of the matrix is treated to make it conductive. For this purpose there is used a new process of metallization, highly effective wherever metallization is necessary and particularly useful in connection with the present method.

The treatment preferably comprises carefully spraying the surface with a bronze or copper lacquer and then, when dry, dipping the cathode into an alkaline silver cyanide solution. After dipping the silver cyanide solution is immediately rinsed from the matrix, usually by a light pressure spray. In metallizing a tire matrix it has been sometimes found desirable to cover a strip 11a of the lower edge of the matrix so that this strip will not be metallized and hence not plated.

A satisfactory lacquer may be composed of the following ingredients:

| | Ounces |
|---|---|
| Nitrocellulose lacquer | 2 |
| Copper-bronze powder | 4 |
| Amyl acetate | 12 |

The nitrocellulose lacquer may be of the kind commercially known as "Zapon" and instead of amyl acetate "No. 22 Zapon thinner" may be used. They are products of the Zapon Company of New York city. "Aurum K. Lacquer", made by the Zapon Company and having approximately the above formula, may be used. The copper-bronze powder used was made by Baer Bros., and known commercially as "Barbour" copper-bronze.

The silver cyanide solution may contain 3 ounces of silver cyanide and 6 ounces of sodium cyanide to a gallon of water. However, the exact composition is not essential. When more than one shell is to be formed on a matrix the matrix is preferably remetallized between depositions.

Any kind of metallized cathodes prepared as described or with variations which may easily suggest themselves are highly satisfactory since they permit the plating process to be started rapidly and greatly lessen the danger of imperfections in the deposit.

A possible variation in the process of forming the cathode consists in metallizing the matrix with molten tin projected onto the surface by an air blast after being melted by an acetylene torch. Another variation comprises coating the matrix with graphite or graphite and iodine.

Plating tank

Treatment of the cathode after assembly and metallization takes place in a plating tank approximately 5 feet in diameter. The tank itself 35 is in the form of a vertical cylinder the depth of which depends upon the number of cathodes to be plated simultaneously. For plating two cathodes at a time a depth of 18 inches is sufficient. Usually the tank is of steel and preferably it is lined with rubber 36. Before use it may be washed out with an acid and with an alkali to remove any materials which might disturb the plating.

Angle members 37 affixed by bolts 38 to the upper edge of the tank support insulating blocks 39 of hard rubber or other insulating material, which in turn support a heavy conductor ring 40 from which hang a number of nickel anodes 41, spaced about eight inches from the cathode. A source of plating current is connected to the conductor ring by any suitable means.

The anodes are preferably of rolled annealed nickel but may be of any other of the usual types such as electronized, cast, or electrolytic. Die cast electrodes deoxidized with magnesium are quite satisfactory. Each anode is enclosed in a bag 43 of muslin, felt, or other porous material which will allow substantially free circulation of the plating liquid while filtering out all solid impurities. When a cloth bag is used it is first washed to remove the starch, sizing and the like. As a substitute a porous clay diaphragm may surround the anodes. While this is even more satisfactory than cloth bags it is also more expensive.

In the center of the plating tank a large bag 44, of material similar to that of the anode bags, is suspended by straps 45, from the insulating block 39. This bag surrounds the cathode and acts as an additional protection against solid impurities which might cause defects in the plating. The freshly filtered solution is run into this bag from which it filters constantly into the anode section, thus keeping fresh solution always around the cathode.

Figure 3:
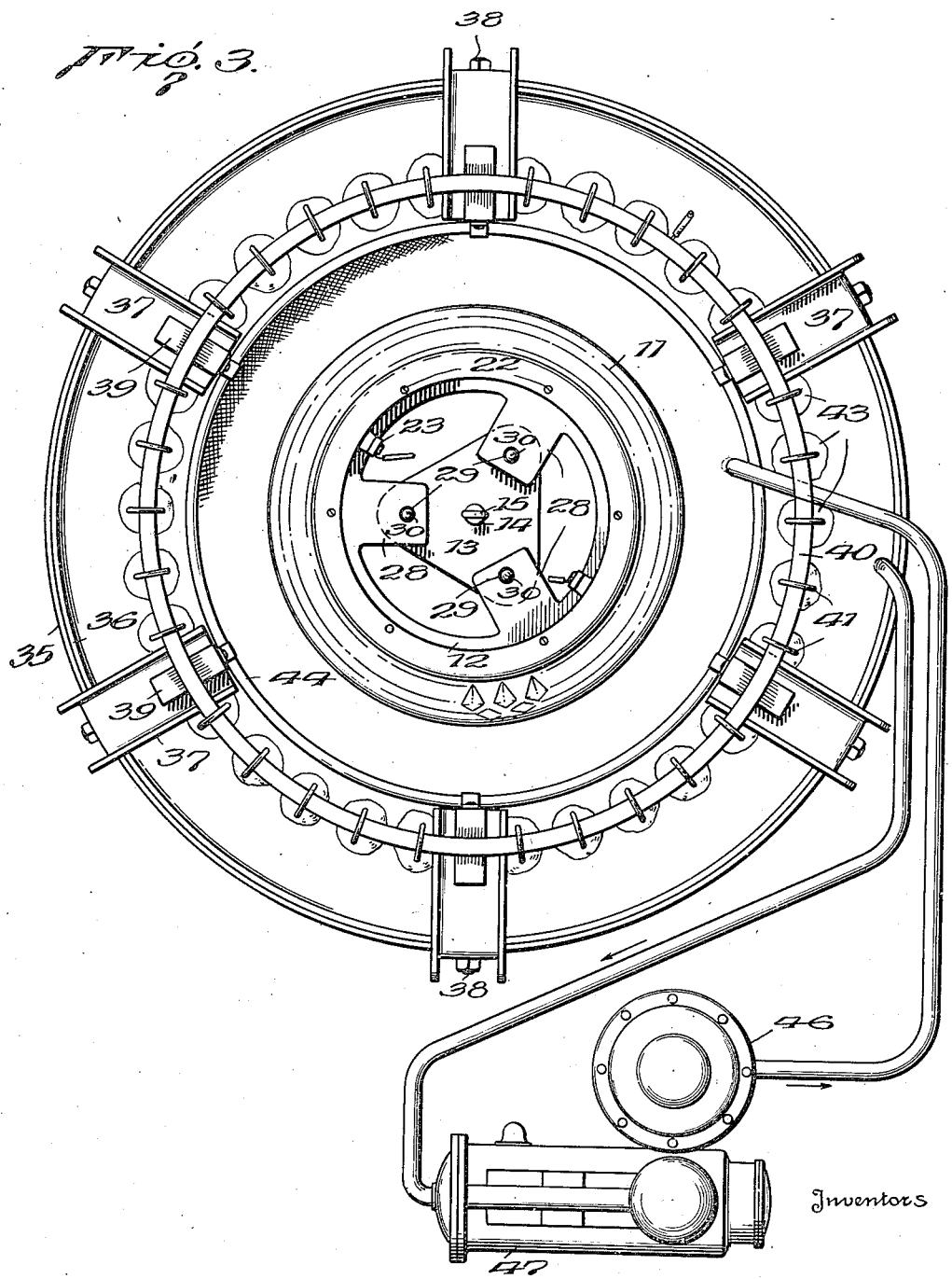
Figure 3 is a top plan view of tank and filter equipment with the cathodes in the tank.

A final precautionary device against solid impurities consists in a clay cup filter device 46 (Figure 3) through which the plating liquid is continuously forced by a pump 47 during the plating process. Before plating the entire solution is carefully filtered at a temperature of 120 to 140° F.

The plating solution

As more particularly described in the applications of Fred K. Bezzenberger and Ralph C. Bateman already noted, the composition of the bath which it has been found advantageous to use for plating according to the present invention is much different from the usual nickel plating solutions. The ordinary nickel plating baths may, however, be used without departing from the broad scope of this invention.

The first major difference in the new bath is in the concentration of nickel which is approximately twice that heretofore used. Instead of this change producing an unusable bath as might be expected, it produces a bath of not only greater plating capacity but also of greater throwing power than any of the baths heretofore known. Thus while a bath of the composition, Nickel sulphate ($6\frac{1}{2}H_2O$) _____oz__ 40
Nickel chloride ($6H_2O$) _____oz__ 4
Boric acid_____oz__ 4
Water_____gallon__ 1
Hydrogen peroxide over .10 gram per liter.
Specific gravity 1.188 at 60° F.

will operate satisfactorily at no greater rate than 150 amperes per square foot, a bath of the new composition, Nickel sulphate ($6\frac{1}{2}H_2O$) _____oz__ 80
Nickel chloride ($6H_2O$) _____oz__ 4
Boric acid_____oz__ 4
Water_____gallon__ 1
Hydrogen peroxide over .10 gram per liter.
Specific gravity 1.275 at 78° F.

plates well at 240 amperes per square foot. Furthermore the thickness of the metal deposited in the grooves of a matrix formed as heretofore described is increased approximately 25 per cent by the use of the new bath composition.

Other plating solution formulas employing other salts than nickel sulphate may be used and the exact amounts of the ingredients are not invariable.

Another improvement in the plating bath lies in the control of the acidity. The concentration of the bath presents a new benefit in this connection since the acidity of the concentrated bath is decidedly more stable and small changes therein have less effect upon the plating. In controlling the acidity it has been found that a pH of 4.8 is most satisfactory while a bath having a hydrogen ion concentration of 1.0 to 6.0 will operate without difficulty. Colorimetric standards may be used to control the acidity and adjustments are made with acid or ammonia at approximately half hour intervals during plating.

In plating with nickel, the presence of hydrogen and its codeposition with the nickel appears to be responsible for the formation of a hard brittle deposit which is probably a hydrogen nickel alloy. To prevent this and also to prevent hydrogen bubbles from forming on the cathode, an oxidizing agent such as ozone or hydrogen peroxide may be added to the solution. Preferably hydrogen peroxide is added to and kept in the solution in a concentration in excess of .065 gram of anhydrous hydrogen peroxide per liter of solution. Slightly over .10 gram per liter has been found to give optimum results with the second solution given above and perhaps even more would have little ill effect. However, to use a great excess is but to waste the reagent since no additional benefits accrue. Since the amount of hydrogen peroxide necessary depends upon various factors such as current density, voltage, bath composition and temperature, the amount necessary should be redetermined experimentally should any of these factors be materially changed.

To control the amount of hydrogen peroxide it is first necessary to determine the amount present as the amount consumed varies widely with the conditions of the plating solution. A reagent for this purpose may be made by adding a solution of .02 gram of cornstarch in 100 cc. of water to a cold solution of 15 grams of potassium iodide in 200 cc. of water. When 5 cubic centimeters of this reagent are added to 10 cubic centimeters of the plating solution a coloration is produced the intensity of which is proportional to the amount of hydrogen peroxide present. In the concentrated plating solution a light coloration is produced by .10 gram per liter of anhydrous hydrogen peroxide while a rather deep color is produced by .60 gram per liter.

The exact amount of peroxide may be determined by comparing the test samples with a standard to which a known amount of hydrogen peroxide has been added. However, a little experience enables the operator to judge the amount quite accurately without a standard. Like the test of acidity, this test is also performed at approximately half hour intervals. The necessary addition of hydrogen peroxide may be made at the time of the test but is preferably made more slowly by allowing the hydrogen peroxide to drip into the tank over a considerable period of time. The peroxide may be allowed to drip into the bath continually at a rate which is adjusted according to the results of the half hour tests.

As a special precaution against foreign matter in the plating solution it has been found advantageous to filter the solution carefully at a temperature of 120 to 140° F. before it is used.

Process of plating

Having described the plating apparatus and the solution we come next to the process of plating. The cathode carrying the metallized matrix is lowered into the plating solution, which has already been carefully filtered and the filter pump is started to place the filter in continuous operation. Anode and cathode bags are in place. During deposition the filter pump provides the only agitation.

At the start of the plating, which should follow quickly after the cathode is lowered into place, a low potential is placed across the cell, using either the new concentrated bath or a bath of the concentration usually employed. The voltage is raised slowly during the first fifteen or twenty minutes and then a little faster until the final voltage is attained. For example, using the new concentrated bath, maintained at a temperature of 120 to 140° F., a potential of two volts may be used to start, and this may be raised one volt each five minutes for the first fifteen or twenty minutes and then somewhat faster so that at the end of a half hour the voltage is 12 or 13, and a voltage of 18 (which may be used during the balance of the plating operation, is reached in somewhat less than one hour after starting. While not invariable this represents a satisfactory starting period, producing a smooth, closely knit base upon which to form the remainder of the shell.

With the new concentrated bath, after starting, the plating is continued at a current rate of 150 to 250 amperes per square foot or more thus completing the formation of the shell in 6 to 15 hours or less, with a total deposit of from 800 to 4000 ampere hours per square foot of cathode surface. Surprising as it may seem, the metal so rapidly deposited is not burned but is especially ductile and smooth, both within the grooves and on the outer surfaces of the tread. Furthermore, the relative thickness of the metal within the deep grooves of the matrix may be increased by 25 percent or more due to increased "throwing" power resulting from the new process.

During the deposition it has been found advantageous to lift the cathode from the solution occasionally to free it from bubbles entrapped in the grooves or clinging to the surfaces. This lifting is conveniently done every half hour but may be done less often or eliminated entirely if care is taken to be sure that the cathode is thoroughly wet at the beginning of the plating. At the end of the plating the cathode is carefully rinsed, the matrix and shell removed and stripped apart. To remove the matrix, with minimum distortion of the nickel shell, it has been found advantageous to place the matrix and shell horizontally on a suitable support, with the large circumference resting on the support, and then push the matrix down thru an opening in the support and away from the shell.

Mold frame

After the matrix has been plated and the electroformed metal shell 49 removed therefrom and preferably trimmed to remove the rough edges, there remains but to mount the shell in the mold frame. This frame comprises a heavy annular ring 50, one of the lateral surfaces of which is hollowed out to form half of a mold for a vehicle tire. A circumferentially extending section 51, of the surface of the hollowed out portion is cut accurately to the shape which is to be given to the side wall of the tire, while the remaining section 52 of the surface is merely cut away to receive and support the electroformed shell 49 which is to shape the tread portion. The section 52 which is to support the electroformed shell is preferably, although not necessarily, formed with dove-tail grooves 53 therein. The grooves permit the metal which seals the shell to the frame to anchor itself firmly to the frame. Two lugs 54 projecting inwardly from the annular frame and pierced by openings 55 provide means for handling the mold with the hook of a lift.

Mounting the shell

The electroformed shell includes, at both the inner and outer diameters, an extension which forms no part of the mold itself, but is useful in assembling the shell in the mold frame. The upper extension 80 serves to anchor the shell into the frame, and the lip 84 affords an appendage easily grasped and useful in drawing the shell into position in the mold frame, as explained below. It is not necessary that either of these extensions encircle the entire shell, as suitable extensions at more or less frequent intervals may be used.

To mount the shell 49 in the mold frame, the shell which may be bent somewhat in stripping or trimming, must be brought back to the desired shape. This is effected by the use of a solid metal ring or jig 60 of a shape similar to a lateral one half of a tire, thus having a curved side 61 against which the shell 49 is pressed to shape it, and a flat side 62. On the flat side adjacent the outer edge are a plurality of holes 63 each adapted to receive the unthreaded end of a bolt 64 threaded through the body member 65 of a small clamp. A wing head 66 on the bolt permits manual removal thereof from the clamp.

In mounting the shell 49 in the mold frame the jig 60 is first removed from the frame, then the shell is placed in the frame with the anchor ring 80 placed against the circular ring 81 of the frame. The shell 49 may be bent somewhat in handling and it is necessary that it be properly lined up before the molten metal used to back it up is poured into place. To line the shell up the jig 60 is inserted in the frame with the surface 82 of the jig registering against the surface 83 of the frame. By tightening the nuts 87 on the hook shaped bolts 73 which are hooked through the openings 55 in the lugs 54 on the mold the bar 72 holds the jig firmly in place. With the jig thus in place it is important to draw the shell up around the jig and this is done by pulling on the lip 84 of the shell. When the shell is pulled up so that the surface 85 registers against the surface 86 of the jig the lip 84 is clamped in place by turning the set screws 78 so as to push the upper ends 69 of the clamping fingers away from the body of the clamps and thus cause the lower ends 68 to hold the lip 84 firmly in place. The molten metal is then poured in back of the shell and ordinarily somewhat more than is necessary to fill the cavity up to the level of the surface 85 is employed. During the pouring a metal ring 74 is positioned on the mold frame around the shell to confine the excess molten metal. Then, after the metal has set and the bar 72 and ring 74 have been removed, this excess metal is machined off to the height of the surface 86 and the lip 84 of the shell is trimmed so that the shell and the molten metal as well as the surface of the mold are perfectly even at this point, and will register perfectly with another mold and shell similarly formed so that when the two are placed together a tight mold is obtained. Eyes 71 on the jig provide means for readily grasping it with the hook of a hoist.

A soft metal which may be advantageously used to attach the shell to the frame comprises 60 parts of lead, 18 parts of antimony, 20 parts of tin, 1 part of copper and 1 part of bismuth. Other compositions such as 75 parts lead, 19 parts antimony, 5 parts tin and 1 part copper are also satisfactory.

I claim:

1. In forming a tire mold from an electrodeposited shell for the tread portion thereof and a mold frame which includes in addition to a surface to form the side wall, a cavity for the shell, the steps which comprise placing the shell so that one portion thereof is adjacent the side-wall surface in the frame, then bringing the shell into the position necessary to form the tire mold by drawing it over a removable jig and filling the space between the mold and shell.

2. In forming a tire mold from an electrodeposited shell for the tread portion thereof and a mold frame which includes in addition to a surface to form the side wall, a cavity for the shell, the boundary between said surface and cavity being circular and the shell being formed with a circular appendage to fit thereover, the steps which comprise placing the shell with said appendage in place on said frame, and holding it in place by means of a jig, pulling the shell up tightly against the jig and then permanently securing the shell in place by pouring molten metal between the shell and the wall of said cavity and allowing the metal to harden.

3. Apparatus for forming a tire mold that comprises a metallized rubber matrix cathode, a plating bath, means to support the matrix horizontally in the bath, means to supply electric current uniformly to the entire surface of the matrix and anode means encircling the cathode when in the bath.

4. Apparatus for the manufacture of vehicle tire molds which comprises a metal annulus having a surface shaped to mold a side wall of a tire and a cut-away portion for receiving an electrolytically formed shell shaped to mold part of the tread portion, an annular jig with a surface shaped to fit that surface of the annulus which is shaped to mold the side wall of a tire, at the outer circumference of the jig gripping-means to hold the shell in place, and means anchored to the inner wall of the annulus for holding the jig in place.

RALPH C. BATEMAN.